United States Patent
Vogtlin et al.

[11] Patent Number: 6,119,451
[45] Date of Patent: Sep. 19, 2000

[54] NITROGEN OXIDE REMOVAL USING DIESEL FUEL AND A CATALYST

[75] Inventors: George E. Vogtlin, Fremont; David A. Goerz, Brentwood; Mark Hsiao, San Jose; Bernard T. Merritt, Livermore; Bernie M. Penetrante; John G. Reynolds, both of San Ramon; Ray Brusasco, Livermore, all of Calif.

[73] Assignee: Regents of the University of California, Oakland, Calif.

[21] Appl. No.: 09/295,006

[22] Filed: Apr. 20, 1999

[51] Int. Cl.[7] ............................. F01N 3/00; B60K 13/04
[52] U.S. Cl. ............................................ 60/274; 180/309
[58] Field of Search .................... 260/274, 297, 260/275, 285; 60/300; 423/212; 123/568.11; 180/309, 89.2; 181/213

[56] References Cited

U.S. PATENT DOCUMENTS

| | | | |
|---|---|---|---|
| 5,022,226 | 6/1991 | Bell | 60/274 |
| 5,343,702 | 9/1994 | Miyajima et al. | 60/285 |
| 5,618,505 | 4/1997 | Subramanian et al. | 423/213.2 |
| 5,809,774 | 9/1998 | Peter-Hoblyn et al. | 60/274 |
| 5,809,775 | 9/1998 | Tarabulski et al. | 60/274 |
| 5,845,485 | 12/1998 | Murphy et al. | 60/274 |
| 5,924,280 | 7/1999 | Tarabulski | 60/274 |
| 5,947,080 | 9/1999 | Weissman et al. | 123/300 |
| 5,956,942 | 9/1999 | Sebastiano et al. | 60/274 |
| 6,038,853 | 3/2000 | Penetrante et al. | 60/274 |
| 6,038,854 | 3/2000 | Penetrante et al. | 60/297 |

OTHER PUBLICATIONS

Anthony R. Collier and Barbara Wedekind, "The Effect of Hydrocarbon Composition on Lean Nox Catalysis," SAE Technical Paper Series 973000, International Fall Fuels & Lubricants Meeting & Exposition, Tulsa, Oklahoma, Oct. 13–16, 1997.

*Primary Examiner*—Teresa Walberg
*Assistant Examiner*—Daniel Robinson
*Attorney, Agent, or Firm*—Alan H. Thompson

[57] ABSTRACT

Hydrocarbons, such as diesel fuel, are added to internal combustion engine exhaust to reduce exhaust $NO_x$ in the presence of a amphoteric catalyst support material. Exhaust $NO_x$ reduction of at least 50% in the emissions is achieved with the addition of less than 5% fuel as a source of the hydrocarbons.

18 Claims, 3 Drawing Sheets

NITROGEN OXIDE REMOVAL USING DIESEL FUEL AND A CATALYST

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the reduction of $NO_x$ from engine exhaust emissions, and more particularly to the removal of $NO_x$ from diesel engine exhaust.

2. Description of Related Art

The control of $NO_x$ emissions from vehicles is a worldwide environmental problem. Gasoline engine vehicles can use newly developed three-way catalysts to control such emissions, because their exhaust gases lack oxygen. But so-called "lean-burn" gas engines, and diesel engines too, have so much oxygen in their exhausts that conventional catalytic systems are effectively disabled. Lean-burn, high air-to-fuel ratio, engines are certain to become more important in meeting the mandated fuel economy requirements of next-generation vehicles. Fuel economy is improved since operating an engine stoichiometrically lean improves the combustion efficiency and power output. But excessive oxygen in lean-burn engine exhausts can inhibit $NO_x$ removal in conventional three-way catalytic converters. An effective and durable catalyst for controlling $NO_x$ emissions under net oxidizing conditions is also critical for diesel engines.

According to a report published February 1992 by the U.S. Environmental Protection Agency, (Office of Air and Radiation, Office of Air Quality Planning and Standards, Research Triangle Park, N.C. 27711), there are, in general, four approaches to controlling $NO_x$ emissions from combustion sources. For example, controlling $NO_x$ formation by modifying the combustion operating conditions, by modifying the combustion equipment, by fuel switching, and by post combustion control of $NO_x$ by flue or exhaust gas treatment. The first three approaches reduce the original formation of $NO_x$. The latter converts the $NO_x$ that was formed (in the exhaust gas) to something more benign.

With respect to lean-burn engines, catalysts (i.e., catalysts that can decompose $NO_x$ to $N_2$ and $O_2$ in oxygen-rich environments) that have the activity, durability, and temperature window required to effectively remove $NO_x$ from the exhaust have not been effective. Prior art lean-$NO_x$ catalysts are hydrothermally unstable. A noticeable loss of activity occurs after relatively little use, and even such catalysts only operate over very limited temperature ranges. Conventional catalysts are therefore inadequate for lean-burn operation and ordinary driving conditions. An alternative is to use catalysts that selectively reduce $NO_x$ in the presence of a co-reductant, e.g., selective catalytic reduction (SCR) using ammonia as a co-reductant.

Using co-existing hydrocarbons in the exhaust of mobile lean-burn gasoline and diesel engines as a co-reductant is a more practical, cost-effective, and environmentally sound approach. The search for effective and durable SCR catalysts that work with hydrocarbon co-reductants in oxygen-rich environments is a high-priority issue in emissions control and the subject of intense investigations by automobile and catalyst companies, and universities, throughout the world.

SCR catalysts that selectively promote the reduction of $NO_x$ under oxygen-rich conditions in the presence of co-reductant hydrocarbons are known as lean-$NO_x$ catalysts. More than fifty such SCR catalysts are conventionally known to exist. These include a wide assortment of catalysts, reductants, and conditions. The relatively expensive noble metal catalysts have exhibited high activity. Unfortunately, just solving the problem of catalyst activity in an oxygen-rich environment is not enough for practical applications. Like most heterogeneous catalytic processes, the SCR process is susceptible to chemical and/or thermal deactivation. The excess oxygen adsorbs preferentially on the noble, precious metal, e.g., Pt, Rh, and Pd, surfaces in the catalyst, and inhibits a chemical reduction of $NO_x$ to $N_2$ and $O_2$—instead promoting the oxidation of unburned hydrocarbons and carbon monoxide. This is because the CO and $H_2$ reductants tend to react more quickly with the free oxygen, $O_2$, present in the exhaust gas than the oxygen associated with nitrogen in $NO_x$. Also, many lean-$NO_x$ catalysts are too susceptible to water vapor and high temperatures. As an example, the Cu-zeolite catalysts deactivate irreversibly if a certain temperature is exceeded. The deactivation is accelerated by the presence of water vapor in the stream. In addition, water vapor suppresses the NO reduction activity even at lower temperatures.

Thus, the problems encountered in lean-$NO_x$ catalysts include lessened activity of the catalyst in the presence of excessive amounts of oxygen (preference for oxidation of CO and hydrocarbons), reduced durability of the catalyst in the presence of water, sulfur, and high temperature exposure, and narrow temperature windows in which the catalyst is active. Practical lean-$NO_x$ catalysts must overcome all three problems simultaneously before they can be considered for commercial use.

Another major source of catalyst deactivation is high temperature exposure. This is especially true in automobile catalysts where temperatures close to 1000° C. can exist. The high-temperatures attack both the catalyst precious metal and the catalyst carrier, e.g., gamma alumina ($\gamma$-$Al_2O_3$). Three-way catalysts, for instance, are comprised of about 0.1 to 0.15 percent precious metals on a $\gamma$-$Al_2O_3$ wash coat, and use $La_2O_3$ and/or BaO for a thermally-stable, high surface area $\gamma$-$Al_2O_3$. Even though the precious metals in prior art catalysts were initially well dispersed on the $\gamma$-$Al_2O_3$ carrier, they were subject to significant sintering when exposed to high temperatures. This problem, in turn, led to the incorporation of certain rare earth oxides such as $CeO_2$ to minimize the sintering rates of such precious metals.

In one high temperature application described in U.S. Pat. No. 5,618,505, issued to Subramanian et al., researchers have attempted to reduce $NO_x$ from internal combustion engine exhaust with relatively inexpensive base-metal-containing lean-$NO_x$ catalysts using a propane hydrocarbon co-reductant. However, successful NO conversion percentages above 30 are only obtained with propane co-reductant at temperatures exceeding 450 C. Such results are impractical for most, if not all, diesel internal combustion engine exhaust. Furthermore, tests of nine model fuels and a diesel fuel injected into an exhaust stream have shown no higher than 43% $NO_x$ conversions. See Collier and Wedekind, *The Effect of Hydrocarbon Composition on Lean $NO_x$ Catalysts*, SAE Technical Series 97300, Int. Fall Fuels & Lub Meeting & Expos., Tulsa, Okla., (October 1997).

The challenge still exists for lean-$NO_x$ catalysts promotion of $NO_x$ reduction at the lower combustion temperatures associated with diesel exhaust. Modifications of existing catalyst oxidation technology are successfully being used to address the problem of CO and hydrocarbon emissions, but no present solution exists for $NO_x$.

SUMMARY OF THE INVENTION

An object of the present invention is to provide a method for reducing $NO_x$ emissions, particularly emissions from diesel engine exhaust.

A further object of the present invention is to provide a vehicle with reduced $NO_x$ emissions, particularly a vehicle having a diesel engine.

A still further object of the present invention is to provide a system for attachment to an engine with an oxygen rich exhaust, particularly a diesel exhaust, for the reduction of $NO_x$ emissions.

Briefly, the present invention comprises treatment of an oxygen-rich vehicle engine exhaust with an added hydrocarbon, preferably a diesel fuel, in the presence of a amphoteric catalyst support, such as one used in a SCR system, to enhance $NO_x$ reduction. A $NO_x$ reduction process of the invention, conducted in the temperature range of diesel fuel combustion, i.e., from about 175 degrees C. to about 450 degrees C., results in conversion of at least 50% of exhaust $NO_x$ to $NO_x$ conversion products including $N_2$ and $O_2$, and the subsequent conversion of unused diesel fuel to produce benign exhaust products, such as $CO_2$.

An advantage of the present invention is that a method for $NO_x$ emission reduction is provided that uses relatively small amounts of added hydrocarbons with inexpensive amphoteric catalytic components. The reduction can allow the use of catalysts containing essentially no supported metals for relatively inexpensive compliance to $NO_x$ emission reduction laws.

Not only does the process improve the $NO_x$ removal while utilizing inexpensive catalytic materials, but it also allows the combustion of fuels with a concomitant reduction of at least 80% $NO_x$, particularly in an oxygen-rich vehicular diesel exhaust environment. Such an advantage of the present invention is that a system is provided for reducing at least 50% of $NO_x$ emissions with a fuel penalty of less than 5%. For instance, about 500 to about 3500 ppm of diesel fuel addition to a diesel engine exhaust in the presence of a SCR system promotes well above 60% $NO_x$ reduction in the temperature range below 500 degrees C.

DETAILED DESCRIPTION OF THE INVENTION

Figure 1:
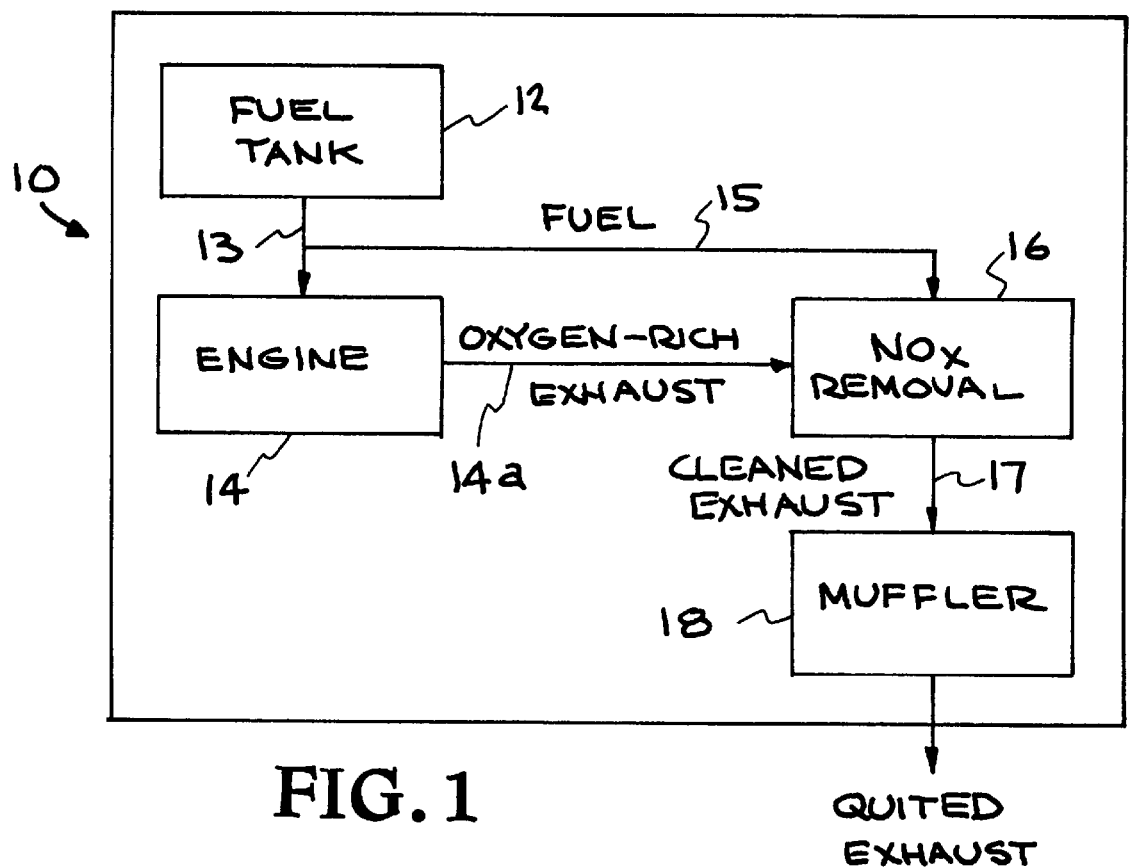
FIG. 1 is a block diagram of a vehicle embodiment of the invention.

FIG. 1 illustrates a vehicle embodiment of the present invention, and is referred to herein by the general reference numeral 10. The vehicle 10 is provided with a fuel tank 12 that supplies an internal combustion engine 14 and a $NO_x$ reduction unit 16. The fuel used may be #2 diesel oil and the engine 14 may be a diesel type common to busses and trucks. The engine 14 has an output of exhaust gas that is both rich in oxygen and oxides of nitrogen ($NO_x$), e.g., NO and $NO_2$. Oxygen-rich exhausts are typical of diesel engines and lean-burn gasoline engines. Such $NO_x$ in the exhaust is environmentally undesirable. The exhaust and a hydrocarbon such as unused fuel from fuel tank 12, are input to the $NO_x$ reduction unit 16 via exhaust outlet 14a and fuel tank bleed line 15, respectively. Hydrocarbons in the fuel and a selective catalytic reduction (SCR) system are used in a one-step conversion of hydrocarbons+$NO_x \rightarrow N_2$, $O_2$, and $CO_2$ by the $NO_x$ reduction unit 16. A muffler 18 is used to quiet the otherwise noisy cleaned exhaust produced in $NO_x$ reduction unit 16 via optional exhaust outlet 17. An oxidative system (not shown), which is usually catalytic, can be employed to oxidize and remove unused hydrocarbon (diesel fuel) from $NO_x$ reduction unit 16 prior to final exhaust emission from the vehicle.

Figure 2:
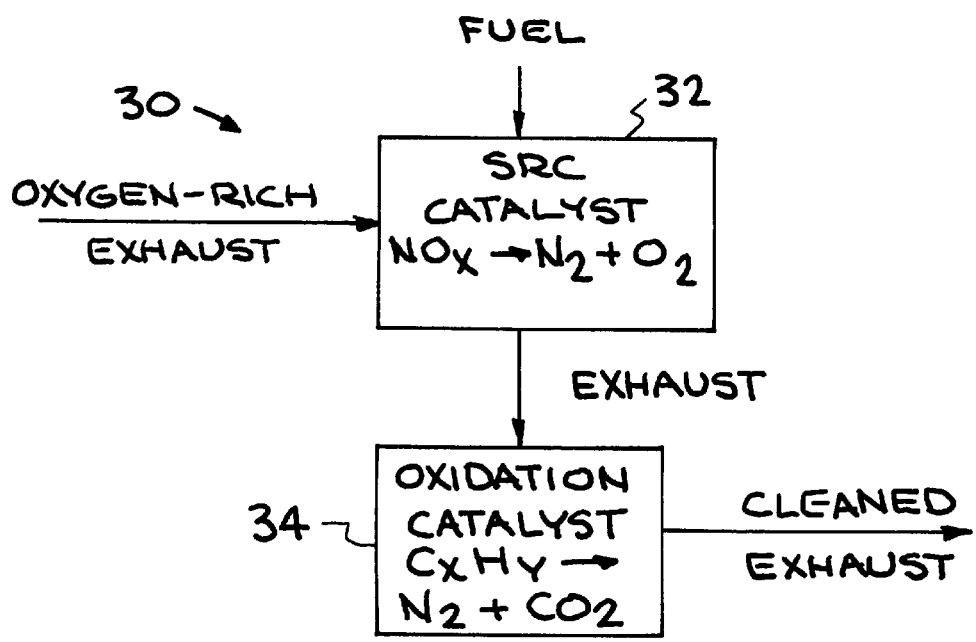
FIG. 2 is a flow chart of the method of the invention.

FIG. 2 illustrates a method embodiment (shown generally as 30) of the present invention for $NO_x$ removal in oxygen-rich exhaust flows. The $NO_x$ reduction unit 16 of FIG. 1 represents an implementation of method 30. A step 32 converts the $NO_x$ in an oxygen-rich exhaust flow to $N_2$ by mixing hydrocarbon molecules (e.g., engine fuel) into the oxygen-rich exhaust flow and passing the (normally vaporous) mixture through or over a SCR catalyst, such as a relatively inexpensive gamma-alumina-containing catalyst. Although any conventional SCR catalyst can be employed, catalysts having amphoteric supports, including all forms of gamma alumina, are preferred. Amphoterism is referred herein in the classic sense, i.e., the reactivity of a substance with both acids and bases, acting as an acid in the presence of a base and as a base in the presence of an acid. Among the amphoteric metal oxides that have been shown to be active for reducing $NO_x$ in the presence of both oxygen and hydrocarbon in addition to $Al_2O_3$, are $Ga_2O_3$ and $ZrO_2$. It is highly preferred that the SCR catalyst, i.e., a $NO_x$ reducing catalyst, contain essentially no supported metals deposited onto the porous supports; however, if such supported metals are employed, it is particularly preferred that such metals be a relatively inexpensive, non-noble metal such as Cu, Ni, Sn and the like, rather than expensive Pt, Pd or Rh.

Furthermore, complex hydrocarbons and mixtures of hydrocarbons, such as diesel oil, can optionally be reduced to simpler hydrocarbon molecules by cracking the complex hydrocarbon molecules with a plasma processor or other cracking means. In a subsequent step 34, an oxidizing catalyst, typically any conventional oxidizing catalyst, is used to convert the unused hydrocarbons and $O_2$ to more benign products such as $CO_2$.

Alternatively, a simple hydrocarbon may be supplied to the $NO_x$ reduction unit 16. Some hydrocarbons may be better reductants or better $NO_x$ to $N_2$ promoters. A disadvantage of such an embodiment is that two different supplies of hydrocarbons must be maintained aboard the vehicle 10. An advantage of a preferred embodiment of the present invention is that fuels, such as No. 1 or 2 diesel fuels, can serve as co-reductants with a SCR catalyst to reduce $NO_x$ and concurrently provide fuel for the upstream exhaust-generating engine. Thus, only one uncombusted source of hydrocarbons can be maintained aboard the vehicle. Nevertheless, other hydrocarbons which may be used, at least in part, as a co-reductant with the SCR catalyst include kerosene, propane, cracked No. 1 diesel oil, and cracked No. 2 diesel oil. Since a preferred embodiment of the invention relates to $NO_x$ reduction in industrial diesel fuel-burning engines, stationary or in vehicles, where diesel fuel No. 2 is combusted, a highly preferred hydrocarbon co-reductant added to the $NO_x$-polluted exhaust is No. 2 diesel fuel.

Figure 3:
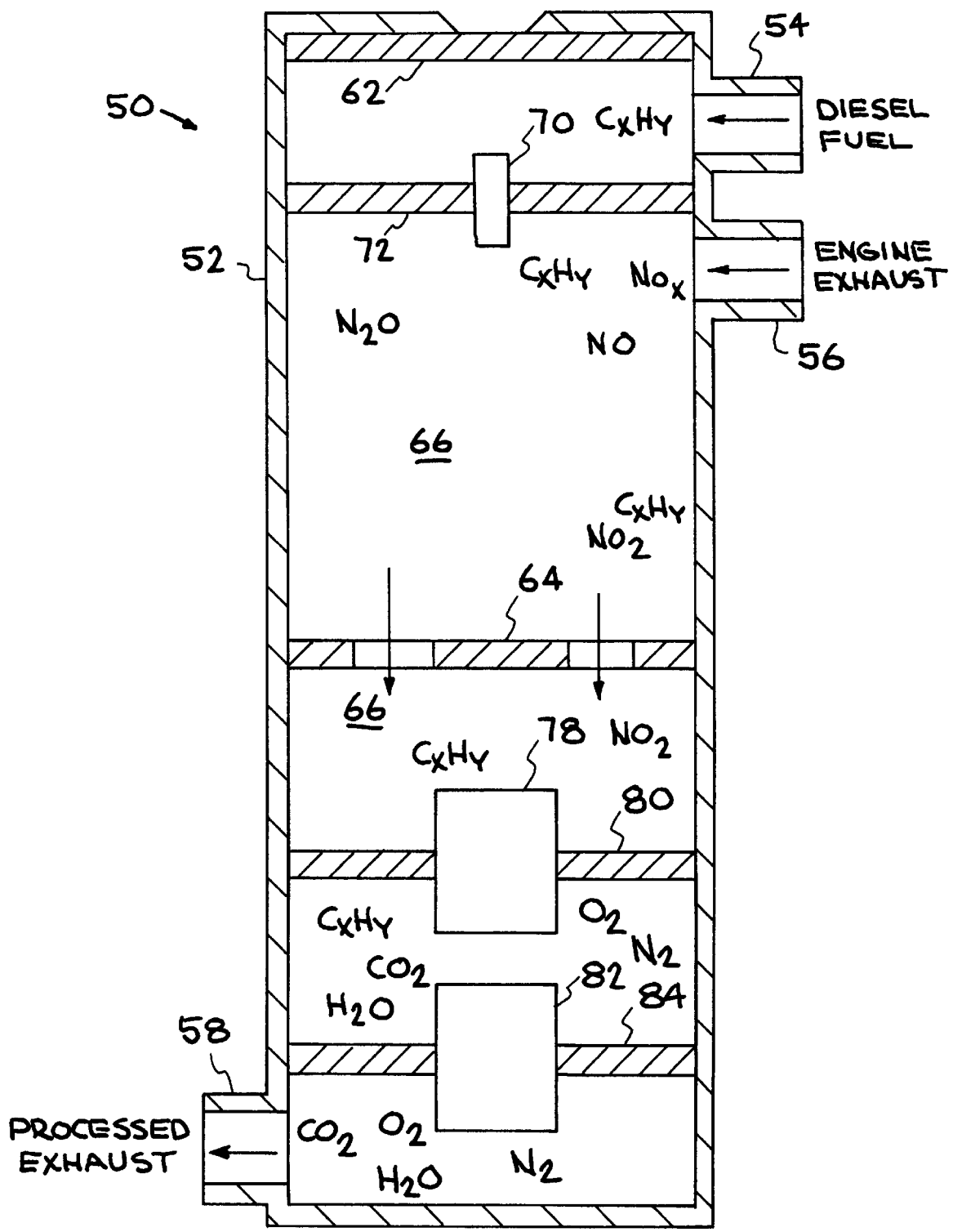
FIG. 3 is a cross sectional diagram representing a $NO_x$ reduction unit of the invention.

FIG. 3 illustrates a $NO_x$ reduction unit (shown generally as 50) of the present invention. The $NO_x$ reduction unit 50 is similar to the $NO_x$ reduction unit 16 of FIG. 1 and similar in operation to the $NO_x$ reduction method 30 of FIG. 2. The $NO_x$ reduction unit 50 comprises a cylindrical housing 52 with an atomized hydrocarbon inlet 54, an engine exhaust inlet 56 and a processed exhaust outlet 58. The housing 52 need not be cylindrical and can take the form of an exhaust manifold attached to an engine. The higher temperatures afforded by close proximity of the $NO_x$ reduction unit 50 to the engine are preferred.

The exhaust and hydrocarbons are mixed in a chamber 66 between an insulative bulkhead 72, which separates inlets 54 and 56, and insulative bulkhead 80 on which a catalytic converter 78 is mounted. The exhaust and hydrocarbon parameters may be made independently variable and microcomputer controlled to accommodate a variety of exhaust flow rates being processed. Another parameter—temperature—is a feature of the invention. The mixture of added hydrocarbons (particularly additive diesel fuel) is passed over or through catalytic converter 78 at temperatures normally less than 500 degrees C., more particularly less than 450 degrees C. and preferably in the range from about 175 degrees C. to about 425 degrees C., normally within the boiling temperatures of diesel fuel. In a preferred embodiment, hydrocarbons in a concentration above about 1000 ppm of the exhaust are added to the exhaust and passed over a SCR catalyst at a temperature above about 200 degrees C.

Optionally, a preprocessor 70 is constructed as a concentric metal tube that pierces the bulkhead 72. The preprocessor 70 can crack the complex hydrocarbons provided from the inlet 54 into simpler hydrocarbons using, for instance, a non-thermal plasma. Furthermore, both the hydrocarbons and a non-thermal plasma from a plasma converter (not shown) can be mixed in chamber 66 and used to convert NO in the flow from the engine exhaust inlet 56 into $NO_2$. Optionally, porous bulkhead 64 can be positioned within chamber 66 to concentrate $NO_2$ with the hydrocarbons in the area of the catalyst surface of catalytic converter 78.

However, in the principal thrust of the invention, catalytic converter 78, mounted on bulkhead 80, provides for the selective catalytic reduction of the exhaust $NO_x$ (predominantly $NO_2$ if the $NO_x$ reduction is plasma-assisted or otherwise) to more environmentally benign molecules, such as $N_2$, $O_2$, $CO_2$ and $H_2O$, using the added hydrocarbon co-reductant mixed with the exhaust in chamber 66. In general, catalysts having an amphoteric support are utilized in the invention; however, any SCR catalyst, i.e., lean-$NO_x$ catalyst, can be employed in the catalytic converter. The catalytic converter 78 may preferably be configured as a bed of gamma alumina pellets, e.g., $\gamma$-$Al_2O_3$. The catalytic converter 78 may also be configured as a wash coat of gamma alumina on a substrate.

An oxidative system, usually an oxidation catalyst 82 can be mounted on a bulkhead 84 and provides for the burning of any excess (unused) hydrocarbons not consumed by the catalytic converter 78. Preferably, the flow of hydrocarbons into the inlet 54 is controlled to minimize such excess hydrocarbons that must be burned by the oxidation catalyst 82.

Oxygen enhances the selective catalytic reduction of NO by hydrocarbons. Although not bound by any one theory, empirical evidence suggests that the $NO_x$ reduction by lean-$NO_x$ catalysts activate the NO by converting it to $NO_2$, either in the gas phase or on the surface. The $NO_2$ can then be reduced on the catalyst surface when in the presence of hydrocarbons. The gas-phase formation of $NO_2$ is, in theory, probably sufficient to account for the observed rate of $NO_x$ reduction by $\gamma$-$Al_2O_3$. Whether the heterogeneous oxidation of NO also takes place is not clear. The functions of the active sites are complicated because a multitude of reactions happen on the surface. There are sites on which the NO may be activated by oxidation to $NO_2$, sites where the hydrocarbon molecule is activated, sites where the carbon oxides are formed, and sites where the coupling of nitrogen-containing molecules take place. Individual sites may be involved in more than one step, or there may be two or more different sites in close proximity acting as a multi-functional catalyst.

Catalysts that are active in selective catalytic reduction of NO by hydrocarbons usually have surface acidity, e.g., they possess surface hydroxyl groups. The simplest surface on which selective catalytic reduction by hydrocarbons is observed is the amorphous, acidic form of alumina, known as $\gamma$-$Al_2O_3$. In addition to having the best physical surface structure, e.g. surface area of 100–200 square meters per gram, $\gamma$-$Al_2O_3$ is also the most acidic form of stable alumina.

Figure 4:
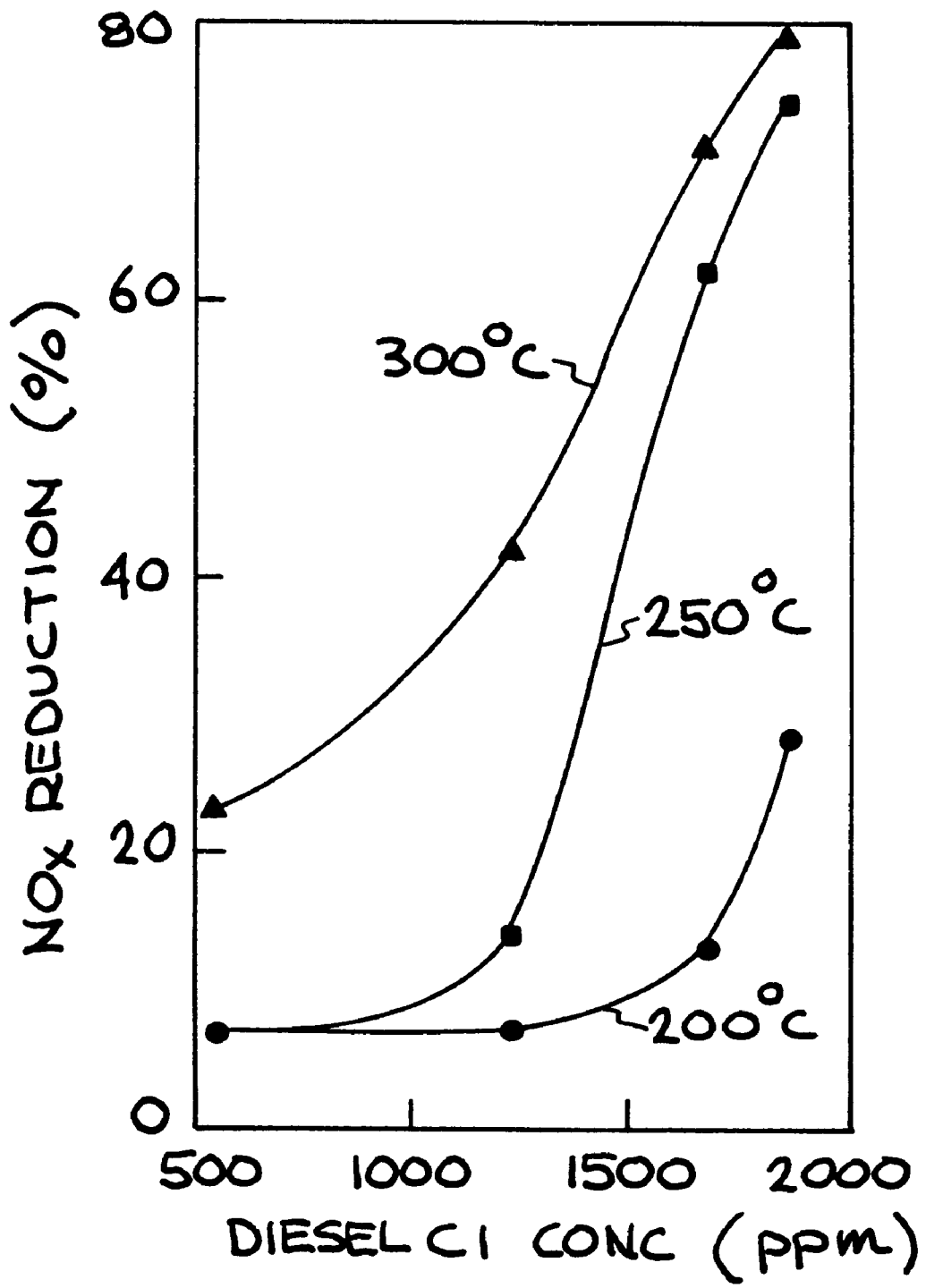
FIG. 4 is a graph illustrating the percentage of $NO_x$ reduction in a diesel engine exhaust by gamma alumina catalyst as a function of the concentration of diesel fuel addition to the exhaust at 200 degrees C., 250 degrees C., and at 300 degrees C.

In FIG. 4, at incoming exhaust temperatures of 200 degrees C., 250 degrees C., and 300 degrees C. to a catalytic converter, the percentage of total $NO_x$ reduction in an exhaust from a diesel engine is compared with a varying diesel fuel concentration, using an additional unburned portion of the diesel fuel burned in the diesel engine as the co-reductant. The catalyst contains particulate alumina, such as pellets of pure $\gamma$-$Al_2O_3$. The $NO_x$ reduction is attributed the combination of additive diesel fuel concentration and the activity of the catalyst. The concentrations of NO and $NO_2$ ($NO_x$) are detected and quantified by both chemiluminescence and infrared absorbance. The $NO_x$ reduction is presumably due to increased $N_2$, since the amount of $N_2O$ and any other oxides of nitrogen, like $HONO_2$, is negligible compared to the reduction in $NO_x$ concentration. The maximum $NO_x$ reduction shown in FIG. 4 can be increased by increasing the amount of additive diesel fuel, increasing the $\gamma$-$Al_2O_3$ and/or modifying the exhaust gas flow rate.

In the three experiments (data summarized in FIG. 4) that are conducted in view of the scheme of FIG. 3 (without options), the respective incoming engine-exhaust gas temperatures are about 200, 250, and 300° C., using actual diesel engine exhaust, which typically contain initial 600 ppm $NO_x$. About 500 ppm diesel fuel is initially injected in each experiment through inlet 54 to the $NO_x$-containing gas exhaust stream inleted through inlet 56 in chamber 66. After passing through the gamma alumina catalyst in catalytic converter 78, less than about 10%, of the $NO_x$ is reduced at the lower temperatures while slightly above 20% is reduced at the higher temperature. A total $NO_x$ reduction of greater than about 50% is achieved after passing through the catalytic converter when the additive diesel fuel concentration is increased to within the range from about 1,300 ppm to about 1,600 ppm. The data exhibits a non-linear effect for the $NO_x$ reduction at a given additive diesel fuel concentration for each inlet exhaust temperature.

Such a non-linear effect can be applied to diesel engine $NO_x$ reduction control, particularly since the exhaust temperatures of the experiments are within the range of typical industrial diesel exhaust temperatures and the additive diesel fuel concentrations indicate greater than 50% $NO_x$ reduction with less than a 5% fuel penalty for the overall diesel combustion system. For instance, at an exhaust temperature of 250 degrees C. about 1,600 ppm of additive diesel fuel provides co-reductant activity with the gamma alumina catalyst the effects greater than 50%. $NO_x$ reduction. A 1,600 ppm additive diesel fuel concentration is only about a 2.2% fuel penalty. Furthermore, such a $NO_x$ reduction improvement from less than 10% $NO_x$ reduction with an additive diesel fuel concentration of about 1,100 ppm is clearly unpredicted and unexpected. Accordingly, even at such a low exhaust temperature as 200 degrees C., the results illustrated in FIG. 4 clearly suggest that relatively high percentages of $NO_x$ reduction can be achieved at concentrations of over 3000 ppm additive diesel fuel, i.e., still less than a 5% fuel penalty.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A method for reducing nitrogen oxides ($NO_x$) in oxygen-rich exhausts from high-temperature combustion, the method comprising the steps of:

adding hydrocarbons boiling in the range from about 150 degrees C. to about 450 degrees C. to an engine exhaust comprising $NO_x$ to produce a hydrocarbon-added engine exhaust; and converting $NO_x$ in the hydrocarbon-added engine exhaust at a temperature less than about 450 degrees C., with a selective catalytic reduction (SCR) catalyst comprising an amphoteric support, to a gas flow including $N_2$ and $O_2$.

2. The method of claim 1 wherein the gas flow comprises unconverted portions of said hydrocarbons and said unconverted portions are subsequently oxidized to $CO_2$.

3. The method of claim 1 wherein said hydrocarbon-added engine exhaust contains sufficient hydrocarbons to result in a non-linear effect of an increased $NO_x$ reduction percentage from contact with said SCR catalyst.

4. The method of claim 1 wherein at least a portion of said $NO_x$ is converted to $NO_2$ in the presence of a non-thermal plasma.

5. A catalytic converter, comprising:

an engine-exhaust gas inlet;

a diesel fuel inlet; and a reductive stage convert of $NO_x$ connected to receive a mixture of $NO_x$ from the engine-exhaust gas inlet and diesel fuel from the diesel fuel inlet, the convert comprising an amphoteric catalyst support that further serves to convert $NO_x$ to gases that include $N_2$, $CO_2$, and $H_2O$.

6. The converter of claim 5, wherein:

said catalyst of said reductive stage convert consists essentially of a gamma-alumina catalyst ($\gamma$-$Al_2O_3$).

7. The converter of claim 5 further comprising a plasma converter upstream of said catalyst.

8. A method for reducing $NO_x$ contained in an oxygen-rich diesel engine exhaust, said method comprising:

preparing a mixture of a diesel engine exhaust and a diesel fuel in a concentration from about 500 ppm to about 3500 ppm of said diesel fuel in said diesel engine exhaust;

contacting a selective catalytic reduction (SCR) catalyst with said mixture at a temperature less than about 450 degrees C. to reduce at least 50% of said $NO_x$ contained in said diesel engine exhaust.

9. The method of claim 8 wherein said temperature is in the range from about 175 degrees C. to about 425 degrees C.

10. The method of claim 9 wherein injecting said diesel fuel into said exhaust in a concentration greater than 1000 ppm at a temperature above about 200 C. and at least 80% of said $NO_x$ is reduced.

11. The method of claim 10 wherein said concentration of diesel fuel comprises less than 10% of a diesel fuel requirement to produce said diesel engine exhaust.

12. The method of claim 8 wherein said SCR catalyst comprises gamma alumina.

13. The method of claim 8 wherein after contacting said mixture with said SCR catalyst, unconverted portions of said diesel fuel are subsequently oxidized to $CO_2$.

14. A vehicle with reduced $NO_x$ engine exhaust emissions, comprising:

a fuel supply of diesel fuel;

an internal combustion engine connected to receive a major portion of said fuel supply of diesel fuel and to propel a vehicle, and having an oxygen-rich exhaust comprising $NO_x$;

a first reactor for $NO_x$ reduction gas treatment connected to receive a minor portion of said fuel supply of diesel fuel, and said oxygen-rich exhaust comprising $NO_x$, and connected to output therefrom a product of $N_2$ that has been converted from said $NO_x$ and noncombusted hydrocarbons from said diesel fuel, and a second reactor for collection and combustion of said noncombusted hydrocarbons connected to receive said output of the first reactor with said $NO_2$ and connected to receive said noncombusted hydrocarbons, and operably connected to output a second exhaust with reduced $NO_x$ emissions.

15. The vehicle of claim 14 wherein said first reactor comprises said second reactor.

16. The vehicle of claim 14 wherein said first reactor comprises a selective catalytic reduction (SCR) catalyst and said second reactor comprises an oxidizing catalyst.

17. The vehicle of claim 14 wherein said first reactor is equipped to receive said minor portion of said fuel supply of diesel fuel in an amount less than 10% of said fuel supply of diesel fuel.

18. The vehicle of claim 17 wherein said minor portion of said fuel supply of diesel fuel comprises less than 5% of said fuel supply of diesel fuel.

* * * * *